United States Patent [19]
Wiessner

[11] 3,966,320
[45] June 29, 1976

[54] MICROFILM CAMERA

[75] Inventor: Manfred Wiessner, Dresden, Germany

[73] Assignee: VEB Pentacon Dresden, Dresden, Germany

[22] Filed: Apr. 7, 1975

[21] Appl. No.: 565,961

[30] Foreign Application Priority Data
Apr. 10, 1974  Germany............................. 177798

[52] U.S. Cl................................... 355/73; 354/203
[51] Int. Cl.²........................................ G03B 27/60
[58] Field of Search................... 354/202, 203, 120; 355/91, 93, 94, 73, 76, 53; 352/222

[56] References Cited
UNITED STATES PATENTS
3,306,176   2/1967   Myers.................................. 355/91
3,525,291   8/1970   Hakamata et al.................... 354/203

*Primary Examiner*—Joseph W. Hartary
*Attorney, Agent, or Firm*—William A. Drucker

[57] ABSTRACT

A microfilm camera with a suction plate which is provided for holding a sheet of film and which can be moved step by step across a film gate. The film gate is provided, on the bearing surface facing towards the sheet of film, with suction apertures. During each exposure operation, the suction apertures can be connected up to a vacuum pump by means of a suction conduit. This suction conduit can be closed by a valve.

6 Claims, 5 Drawing Figures

MICROFILM CAMERA

BACKGROUND TO THE INVENTION

The invention relates to a microfilm camera with a suction plate which is provided for holding a sheet of film and which can be moved step by step across a film gate.

With cameras of this kind, in order to ensure good definition, the suction plate movable parallel to the film gate must hold the front side of the sheet of film in the plane of the bearing surface of the gate, no matter what the exposure position. Even with the narrowest manufacturing tolerances, however, this requirement cannot be satisfactorily fulfilled.

In a known microfilm camera (British Patent No. 1,051,541) the roll film movable step by step from a delivery spool to a take-up spool can be attracted alternately by the suction chamber of the rear wall during each exposure and by the suction chamber of the transport plate during each advance of the film. Owing to the attraction of the film to the rear wall during the exposure the user has to devote constant attention to any changes occurring in the thickness of the film. With a microfilm camera using sheet film, the continual detachment of the sheet from the suction plate and its re-attraction thereto involves a risk of displacement of the sheet in relation to the plate.

OBJECTS OF THE INVENTION

An object of the invention is to provide a camera with improved definition which will at the same time keep the sheet of film in the position to which it has been adjusted in relation to the suction plate.

A further object of the invention is to provide a camera which, during the actual exposure, will ensure that the sheet of film is evenly and completely on the gate.

SUMMARY OF THE INVENTION

According to the invention there is provided a microfilm camera comprising a film gate having a film bearing surface, a suction plate for holding a sheet of film which can be moved in steps across the film gate, suction apertures on said film bearing surface of said film gate, a vacuum pump, a suction conduit connected between said suction apertures and said vacuum pump during each exposure operation, and a valve for closing the path between the apertures and the vacuum pump.

The suction plate and the suction apertures are preferably connected up to one common vacuum pump, a suction flow regulator being provided in at least the suction conduit. In one advantageous embodiment the suction plate is mounted in such a way that it can be placed on or lifted off the film gate, and the valve being movable into an open position when the suction plate is placed on the film gate and into a closed position when the suction plate is lifted off the film gate. By the raising and lowering of the suction plate, the valve can be operable via a control bar or via a switch operating electromagnetic means. In a further embodiment the valve is operable by means of an electromagnet which can be energised via a switch, by a control cam connected with the shutter blade.

BRIEF DESCRIPTION OF THE DRAWINGS

The invention will be explained by reference to examples illustrated and described, in which.

DESCRIPTION OF PREFERRED EMBODIMENTS

Figure 1:
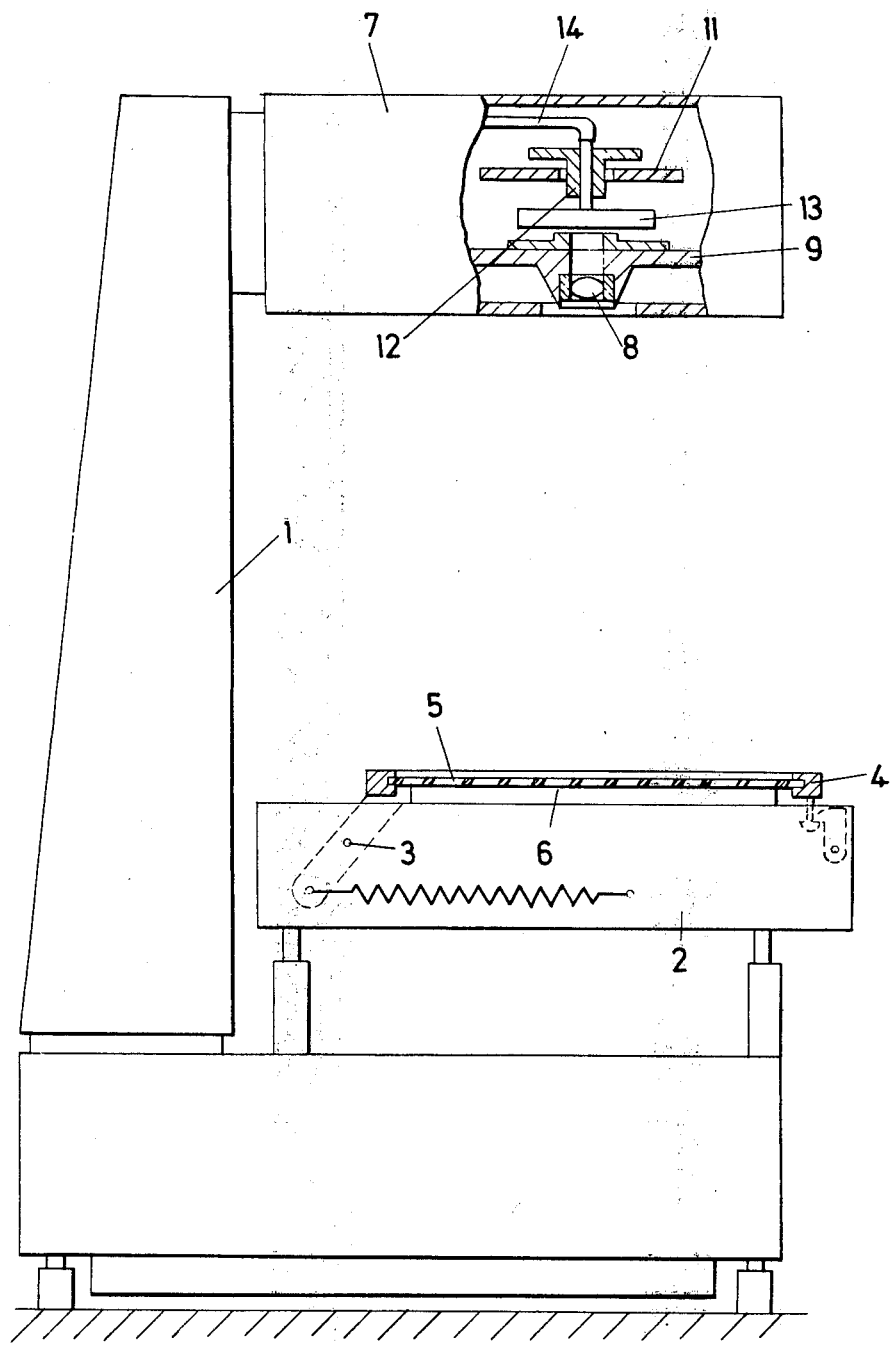
FIG. 1 shows an over-all view of the microfilm camera of the present invention.

In the lower part of the camera stand 1 (see FIG. 1) is mounted the subject table 2, in which is mounted a frame 4 rotatable about the shaft 3. By means of the glass plate 5 mounted in the frame 4, the surface of the original 6 is held in the correct exposing plane. The upper part of the camera stand 1 contains the camera housing 7, in which are mounted the exposure lens 8 and the film gate 9. The slide 11 is movable in slide bars 10. The guide bushing 12, through which the suction plate 13 can be raised and lowered, is connected with the slide 11. The suction plate 13 is connected via the flexible tube 14 with a vacuum pump 15 (see FIG. 2), so that the sheet of film 16 is held against the suction apertures 17 of the suction plate 13 by means of suction.

Underneath the film gate 9 is the chamber 20 having suction apertures 19 with outlets on the bearing surface 18. This chamber 20 is connected with the vacuum pump 15 via the conduit 21. The shutter blade 24, rotatable about the shaft 25, is mounted so as to fall within the poor definition range of the lens 8.

The suction current in the conduit 21 is adjustable by means of the regulating screw 22. By the valve 23 the conduit 21 can be opened and closed alternately. The valve 23 is connected with a control bar 26. The adjusting spring 27 tends to move the valve into the open position. Opposite to the guide tube 28 of the suction plate 13 the control bar 26 has a control plate 29, by which the control bar 26 can be actuated in accordance with the ascent and descent of the suction plate 13.

Figure 2:
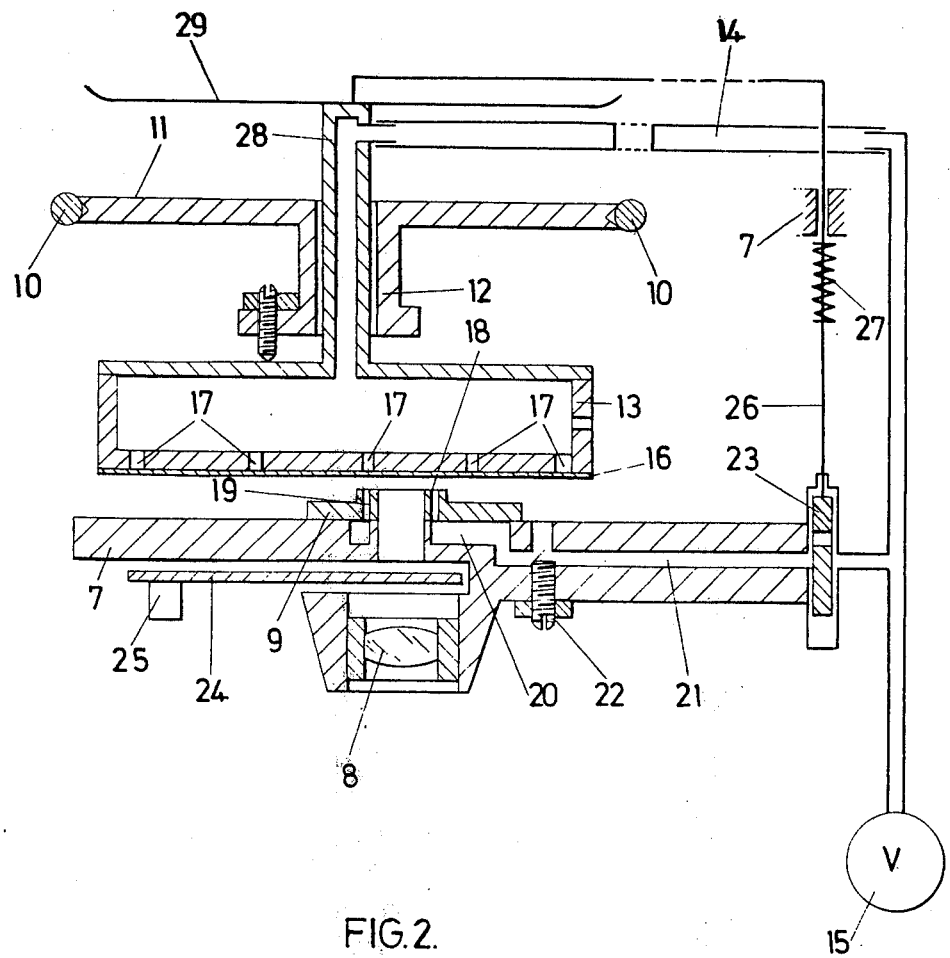
FIG. 2 shows a first embodiment of the invention, with the suction plate shown lifted off the gate.
Figure 3:
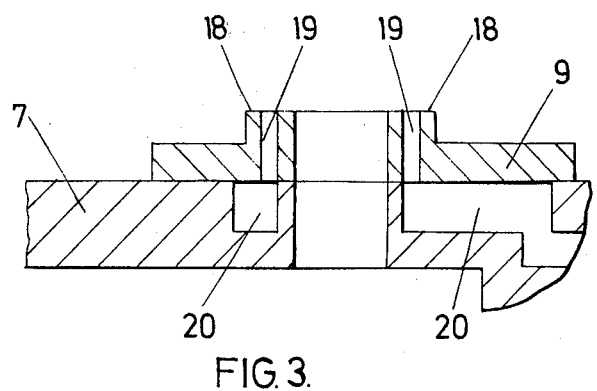
FIG. 3 shows a view of the film gate of the microfilm camera on a larger scale.

This system operates as follows:

In the position illustrated in FIG. 2, the suction plate 13, with the sheet of film 16 held by the vacuum pump 15, has been lifted off the bearing surface 18 of the gate 9. In this raised position the suction plate 13 is moved by one step in relation to the gate 9. In this process the guide 28 slides along the control plate 29 of the control bar 26. The valve 23 has been closed by means of the control bar 26, in opposition to the force of the adjusting spring 27. As soon as the suction plate 13 is lowered onto the bearing surface 18 of the gate 9 in order to take a photograph, the valve 23 is opened by the action of the adjusting spring 27 and the chamber 20 connected up to the vacuum pump 15. The sheet of the film 16 is thus drawn onto the suction apertures 19 of the bearing surface 18 of the gate 9. On a rotation of the shutter blade 24 about the shaft 25 a photograph is taken. After this exposure the suction plate 13, together with the sheet of film 16, is raised, in order to move the film by a further step in which process the valve is closed by means of the control plate 29 and the control bar 26, in opposition to the force of the adjusting spring 27, and the suction current in the air chamber 20 is thus shut off.

When the valve 23 is closed the entire suction current generated by the vacuum pump 15 acts in the suction plate 13, whilst when the valve 23 is open the suction currents are distributed, by means of the regulating screw 22, in such a way that although the sheet of film 16 is still held by the suction plate 13, it can nevertheless, in the zone of the bearing surface 18 of the gate 9, be detached from the suction plate 13 and attracted by the suction apertures 19.

Figure 4:
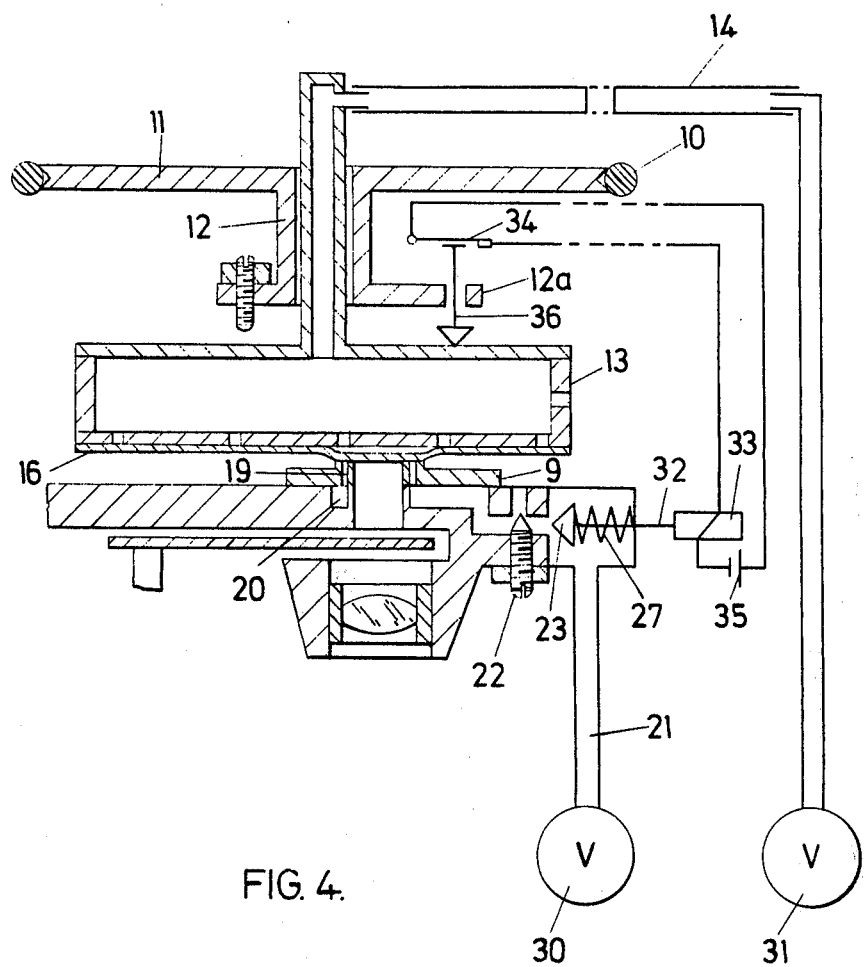
FIG. 4 shows a second embodiment of the invention, with the suction plate shown placed on the gate.

In the version shown in FIG. 4, the suction plate 13 is in communication via the flexible tube 14, with the vacuum pump 31, while the chamber 20 is in communication with the further vacuum pump 30 via the conduit 21. The vacuum pump 30 produces a more powerful suctional effect in the chamber 20 then the vacuum pump 31 in the suction plate 13. The valve 23 tends to be held by the spring 27 in the closed position and is so operatively connected with the electromagnet 33 via the control bar 32. The electromagnet 33 can be connected via the switch 34 to the source of current 35. The switch 34 is actuated by the control pin 36, which is mounted opposite the suction plate 13 and in an axially movable manner on a bearing arm 12a of the guide bushing 12.

In the position shown in FIG. 4, the suction plate 13 has been placed together with the sheet of film 16 on the bearing surface of the gate 9, for the purpose of an exposure. The switch 34 has been closed by the control pin 36, so that the electromagnet 33 is holding the valve 23 in the open position, in opposition to the force of the spring 27. In the zone of the bearing surface of the gate 9, the sheet of film 16 is attracted by the suction apertures 19 of the chamber 20. As soon as a photograph has been taken and in order to advance the film by a further step, the suction plate 13 is lifted off the gate 9, the control pin 36 opens the switch 34 releasing electromagnet 33 so that the valve 23 is closed by the action of the spring 27.

Figure 5:
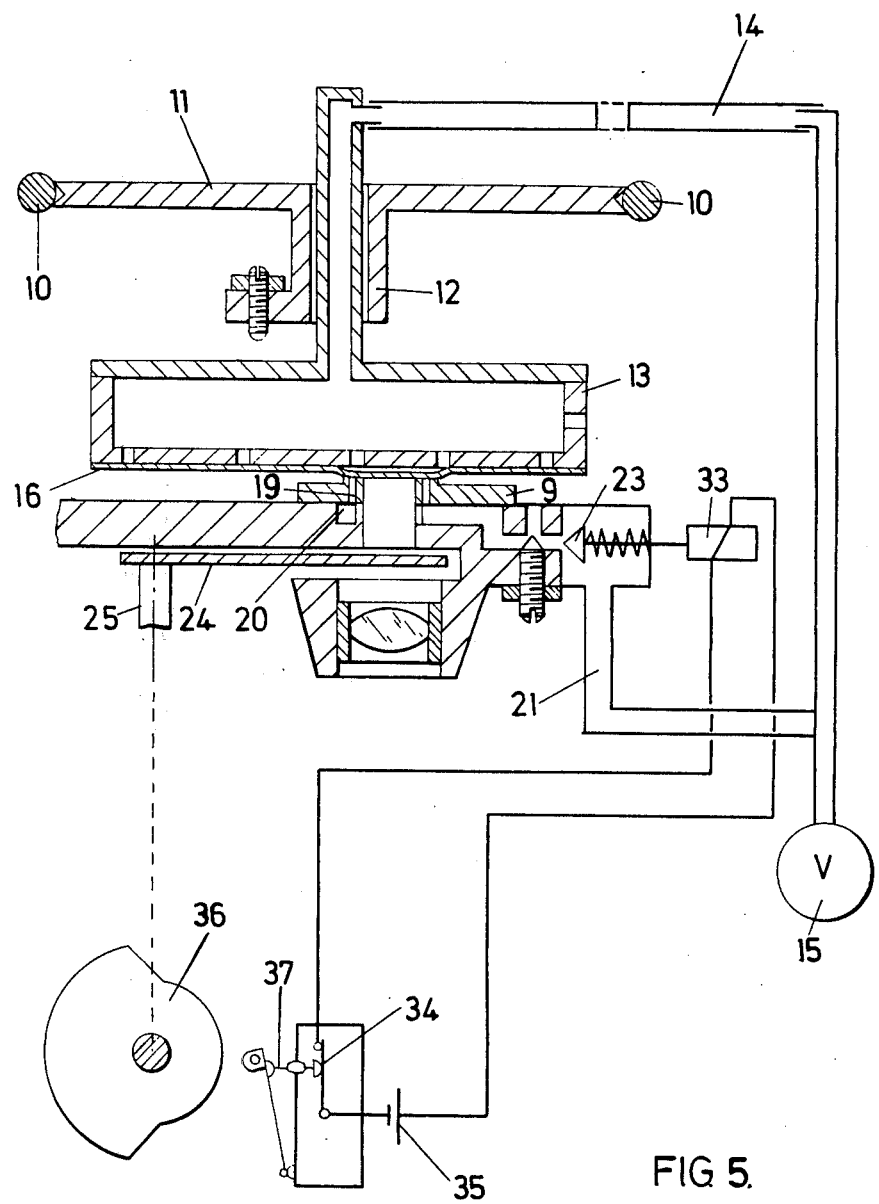
FIG. 5 shows a third embodiment of the invention, with the suction plate shown placed on the gate.

In the version shown in FIG. 5, the suction plate 13 and the chamber 20 have been connected up to the vacuum pump 15 via the flexible tube 14 and via the conduit 21 respectively. The valve 23 provided in the conduit 21 can be operated by the electromagnet 33, which can be connected up to the current source 35 by the switch 34. To the shaft 25 of the shutter blade 24 is attached a control cam 36 which can actuate the switch 34 via the control pin 37. The cam length is such that the switch 34 is closed immediately prior to the commencement of each exposure and re-opened as soon as the latter has been completed. Thus, the opening of the valve 23 takes place after the suction plate 13 has been placed on the gate 9, but before the path of the exposing rays of light can pass to the film on the rotation of the shutter blade 24; the closure of the valve 23 takes place after the said path has been cut off by the shutter plate 24 but before the suction plate 13 is lifted off the gate 9.

I claim:
1. A microfilm camera comprising:
   a. a film gate having a film bearing surface,
   b. a suction plate for holding a sheet of film which can be moved in steps across the film gate,
   c. suction apertures on said film bearing surface of said film gate,
   d. a vacuum pump,
   e. a suction conduit connected between said suction apertures and said vacuum pump during each exposure operation, and
   f. a valve for closing the path between the apertures and the vacuum pump.

2. A microfilm camera according to claim 1, wherein the suction plate and the suction apertures are connected to one common vacuum pump and that a suction flow regulator is provided in at least the suction conduit.

3. A microfilm camera according to claim 1, wherein the suction plate is mounted in such a way that it can be placed on or lifted off the film gate, and the valve is movable into an open position when the suction plate is placed on the film gate and into a closed position when the suction plate is lifted off the film gate.

4. A microfilm camera according to claim 3, wherein the valve can be actuated by a control bar operatively connected with the suction plate.

5. A microfilm camera according to claim 3, wherein the valve can be actuated by an electromagnet in a circuit containing a switch which can be actuated by a control pin operatively connected with the suction plate.

6. A microfilm camera according to claim 1, wherein the valve can be actuated by an electromagnet which can be energised, via a switch, by a control cam connected with the shutter blade.

* * * * *